US005674589A

United States Patent [19]
Bennett et al.

[11] Patent Number: 5,674,589
[45] Date of Patent: Oct. 7, 1997

[54] COPOLYESTER COMPOSITIONS COMPRISING POLY(ETHYLENE NAPHTHALATE BIBENZOATE) BIAXIALLY ORIENTED COPOLYESTER FILMS

[75] Inventors: Cynthia Bennett, Wiesbaden, Germany; E-Won Choe, Randolph; John Anthony Flint, Berkeley Heights, both of N.J.; Bodo Kuhmann, Runkel, Germany

[73] Assignee: Hoechst Celanese Corp., Somerville, N.J.

[21] Appl. No.: 446,748

[22] PCT Filed: Dec. 9, 1992

[86] PCT No.: PCT/US92/10714

§ 371 Date: Jun. 2, 1995

§ 102(e) Date: Jun. 2, 1995

[87] PCT Pub. No.: WO94/13486

PCT Pub. Date: Jun. 23, 1994

[51] Int. Cl.$^6$ .................................... B32B 5/16
[52] U.S. Cl. ................ 428/149; 428/328; 428/330; 428/331; 428/332; 428/480; 524/601; 524/847
[58] Field of Search .................... 428/323, 331, 428/480, 141, 143, 148, 333, 328, 330, 332; 524/601, 847

[56] References Cited

U.S. PATENT DOCUMENTS

| | | | |
|---|---|---|---|
| 3,008,934 | 11/1961 | Wielicki et al. | 528/298 |
| 4,568,599 | 2/1986 | Ono et al. | 428/141 |
| 4,619,869 | 10/1986 | Kiriyama et al. | 428/480 |
| 4,833,024 | 5/1989 | Mueller | 428/349 |
| 5,096,773 | 3/1992 | Sakamoto | 428/323 |
| 5,106,681 | 4/1992 | Endo et al. | 428/323 |
| 5,453,321 | 9/1995 | Choe et al. | 428/364 |
| 5,458,956 | 10/1995 | Shi et al. | 428/229 |

*Primary Examiner*—H. Thi Le
*Attorney, Agent, or Firm*—Scott E. Hanf

[57] ABSTRACT

A copolyester composition comprising poly(ethylene naphthalate bibenzoate) ("PENBB") and 0.001 to 5% by weight of fine silica particles having an average diameter of 0.01 to 3.0 μm. Further, films are made from this copolyester composition.

24 Claims, No Drawings

COPOLYESTER COMPOSITIONS COMPRISING POLY(ETHYLENE NAPHTHALATE BIBENZOATE) BIAXIALLY ORIENTED COPOLYESTER FILMS

BACKGROUND OF THE INVENTION

The present invention relates to PENBB compositions, a process for preparing the poly(ethylene naphthalate bibenzoate (hereinafter "PENBB") compositions, and biaxially oriented PENBB films obtained from the compositions. More particularly, the present invention relates to PENBB compositions of excellent particle dispersion in PENBB and other properties, and films obtained from such compositions.

Polyester films, especially biaxially stretched polyester films such as polyethylene terephthalate (PET) films have good physical, chemical and thermal properties and are widely used as fibers, films and other molded articles. It is, however, desirable to improve some of these properties to provide still more useful film products, such as magnetic recording media and the like.

A film property which is generally desired in the production of these films and in handling of the produced films is good slipperiness between the films themselves or between the film and other bate material. Poor slipperiness of film in the production process or post-treatment such as coating and layer deposition or in handling of the product itself may lead to bad defects such as wrinkles or even the tendency to break and reduced commercial value of the products.

For improving slipping properties of film, a general practice is to add fine particles into polyester to provide proper roughness to the film surface.

As the fine particles used for such purpose, the particles of inorganic compounds inert to polyesters such as talc, kaolin, silica, calcium carbonate, titanium dioxide, graphite, carbon black and the like have been employed. However, with these inorganic particles, which are usually obtained by crushing natural minerals or by synthesis, it is difficult to avoid the presence of some amount of coarse particles or agglomerates of particles.

If coarse particles are contained in polyester or dispersion of particles is poor, the filters used in the extrusion step tend to clog or the film may even break in production. Also, defects such as fish-eyes would be present in the film, giving rise to the problems such as drop-outs in magnetic tapes or reduced dielectric strength in capacitors, etc.

Particularly in the field of magnetic tapes, requests for the reduction of size, longer play times and higher image quality are rising. For the attainment thereof, it is necessary to make the roughness on the film surface more uniform and finer. Especially in order to increase playing time it is necessary to further decrease the film thickness, which in turn requires the mechanical strength, especially the stiffness (modulus) of the film to be improved.

To increase uniformity, it has been proposed to remove coarse particles from the inert inorganic particles by crushing and classifying the particles before use. For example, a method is known in which a powder obtained by crushing a mineral starting material or a powder obtained from a synthesis. The crushing treatment and classifying treatment may be either dry or wet. This method however, although capable of removing coarse particles to a certain extent, was still unsatisfactory.

Various types of silica particles differing in average diameter are commercially available. However, when films were made by incorporating such silica particles in polyester, the produced films would fail to meet said strict property requirements.

Generally, the finely divided particles having a relatively high surface activity such as silica particles tend to form agglomerate particles and are difficult to disperse thoroughly in the copolyester monomers or polymer. Also, agglomeration of particles accelerates in the course of preparation of polyester after the addition of the fine particles and, as a result, the coarse agglomerate particles are formed in the polyester, which make the film surface roughness non-uniform, resulting in a reduced commercial value of the film. Especially in the case that such film is used as support for high quality magnetic tapes such as deposited tapes or metal tapes, a decreased output or increased signal drop-out would result.

It has now been found that the use of the copolyester PENBB as film material while incorporating amorphous fine spherical silica particles provides a film of particular usefulness. The PENBB provides the improved mechanical stiffness (modulus) and strength required to allow reduction of film thickness, while also providing improved dimensional stability, which further improves the quality of, i.e. tapes manufactured from the film. The incorporation of the amorphous fine spherical silica particles provides the film with the desired running properties. The use of such particles is disclosed for PET film in European Patent Application 0 257 611. Such amorphous fine spherical silica particles are obtained by subjecting an alkoxysilane to hydrolysis and a condensation using a specific catalyst and possess a very narrow particle size distribution, contain no coarse particles, have excellent dispersibility in PENBB, and can provide a PENBB composition which can be made into a film having a fine and uniform surface roughness with minimized coarse protuberances, while also having excellent flatness and slip characteristics.

DETAILED DESCRIPTION OF THE INVENTION

The present invention relates to a copolyester composition comprising PENBB and 0.001 to 5% by weight, based on said copolyester, of fine particles (A), spherical silica particles obtained by subjecting an alkoxysilane to hydrolysis and a condensation reaction, said silica particles being substantially amorphous, said fine particles having an average diameter of 0.01 to 3.0 μm, and the diameter distribution index of said particles represented by the formula (1) being in the range of 1.1 to 2.7:

$$\frac{D_{10}}{D_{90}} \tag{1}$$

wherein $D_{10}$ is the diameter of the particle when the cumulative number thereof is 10% of the zonal number of said particles, $D_{90}$ is the diameter of the particle when the cumulative number thereof is 90% of the total number of said particles, and $D_{10}$ and $D_{90}$ are measured under an electron microscope, said cumulative numbers being calculated beginning with the largest particle size.

U.S. Pat. No. 3,008,934 discloses copolyesters containing as acid derived units 4,4'-bibenzoate and a host of other dicarboxylates including 2,6-naphthalic dicarboxylate. It also discloses oriented fibers and films prepared from these copolyesters, however, biaxially oriented PENBB films are not disclosed or envisioned. In particular, those films with improved stiffness (tensile modulus) and tensile strength in both MD and TD as well as thermostability, UV stability, hydrophobicity, dimensional stability and impermeability toward gases in comparison to PET film are not disclosed in U.S. Pat. No. 3,008,934.

Further, the present invention relates to a process for producing the copolyester composition and to films containing the copolyester composition.

The copolyester used in the present invention is PENBB. PENBB as mentioned hereinbefore is a copolyester containing as acid-derived unit at least 5 mole % of a radical of the formula

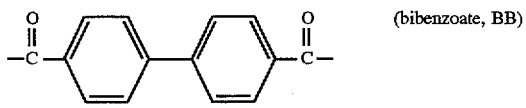

(bibenzoate, BB)

In the case that more than 10 mole percent of terephthalic acid derived radicals are present in the copolymer, the content of bibenzoate derived units is at least 25 mole percent. Films of these copolyesters are mentioned in the published German Patent Application P 4224161.8, which is incorporated herein by reference. Preferably PENBB is a copolyester wherein at least 80 mole percent of the acid derived units (NBB) consist of bibenzoate (20 to 80 mole percent, preferably 40 to 60 mole percent) and naphthalate (80 to 20 mole percent, preferably 60 to 40 mole percent). The remaining 20 or less mole percent may consist of other acid derived units, which e.g. affect the melting point or the crystallization kinetics. Preferably at least 80 mole percent of the diol-derived units consist of $-O(CH_2)_2-O-$units. The remaining 20 or less mole percent consist of other diol-derived units, which e.g. may also affect the melting point or the crystallization kinetics. It may also be desirable to replace minor amounts of the acid- and/or diol-derived units with hydroxycarboxylic-acid-derived units, e.g. such derived from p-hydroxybenzoic acid.

In order to achieve the desired mechanical properties in the biaxially oriented PENBB film it is recommended that the IV value (inherent viscosity, as measured in a 1:1 weight-ratio mixture of pentafluorophenol and hexafluoroisopropanol at a concentration of 0.2 g/dl and a temperature of 25° C.) of the PENBB polymer after extrusion be >0.5 dl/g and preferably >0.55 dl/g.

In the present invention, the particles incorporated in the PENBB for improving the surface flatness and slipping properties of the produced film are fine spherical silica particles having an average diameter of 0.01 to 3.0 μm. The fine spherical silica particles used in the present invention can be obtained by subjecting the starting material alkoxysilane to hydrolysis and a condensation reaction by using an amine type catalyst.

The alkoxysilane used as starting material for the preparation of the fine spherical silica particles may be selected from the alkoxysilane compounds represented by the formula $(C_nH_{2n+1}O)_4Si$ (wherein n is an integer of 1 to 8), the preferred examples thereof being tetramethoxysilane, tetraethoxysilane, tetrapropoxysilane, tetrabutoxysilane and the like. As the catalyst for the hydrolysis and condensation reactions, ammonia, trimethylamine, tetraethylammonium salt aqueous solution, urea and the like, may be employed but an aqueous solution of ammonia is preferred.

The fine spherical silica particles of the present invention can be synthesized, for instance, in the following way. A solution is prepared by dissolving tetramethoxysilane in an alcohol such as methanol (solution A). There is also separately prepared a solution by dissolving water and an aqueous ammonia solution in methanol (solution B). Both solutions are maintained at a predetermined temperature, for example, 20°–30° C. Solution A is added to solution B under vigorous stirring and the mixture is maintained at a predetermined temperature for several hours, then centrifuged, washed with the solvent alcohol, dried and dispersed in ethylene glycol. It is also possible to employ a method in which ethylene glycol is added to a suspension of fine spherical silica particles obtained after the described reactions, and the mixture subjected to distillation to remove excess ammonia, alcohol and water.

In any case, it is preferable that the fine spherical silica particles be ultimately prepared as a slurry in ethylene glycol.

The concentration of thus prepared fine spherical silica particles in ethylene glycol is preferably not higher than 20% by weight, more preferably not higher than 10% by weight, particularly preferably not higher than 5% by weight but not less than 0.5% by weight. If the concentration of the silica particles exceeds 20% by weight, the particles may agglomerate when they are added in the course of the polycondensation reaction. On the other hand, if the particle concentration is less than 0.5% by weight, more ethylene glycol is used than is actually required, resulting in added expense.

The characteristic features of the fine silica particles according to the present invention obtained from the hydrolysis and condensation reactions of alkoxysilane are that these particles are spherical in shape and extremely uniform in size. To evaluate the particle size distribution of the fine spherical silica particles of the present invention, the particle size distribution of the particles was determined by electron microphotograph and the number of the particles having diameters were cumulated, according to size, beginning with the largest particle size, and the diameters of the particles where the cumulative amount thereof are 10% and 90% of the whole were represented by $D_{10}$ and $D_{90}$, respectively. In the present invention, the value of $D_{10}/D_{90}$ is preferably in the range of 1.1 to 2.7, more preferably 1.1 to 2.5, particularly preferably 1.1 to 2.3. A $D_{10}/D_{90}$ value of greater than 2.7 signifies an excessively broad particle size distribution, in which case the control of film surface roughness becomes difficult or the coarse particles increase in number. It is difficult to obtain particles whose $D_{10}/D_{90}$ value is less than 1.1 in an industrial process.

The fine spherical silica particles used in the present invention are preferably 0.01 to 3.0 μm in diameter. If the diameter of these particles is less than 0.01 μm slipping properties of the film are not improved. If the diameter of the particles exceeds 3.0 μm the produced film will be too rough and of poor quality due to the presence of the particles with large diameters.

The fine spherical silica particles preferably comprise 90% by weight or more of silicon dioxide and it is preferable that the volumetric shape parameter ($\phi v$) thereof satisfies the following formula (2):

$$0.4 \leq \phi v \leq \frac{\pi}{6} \qquad (2)$$

wherein $\phi v$ is defined as $\phi v = V/D^3$, V is the volume of particle (μm³) and D is maximum projected diameter (μm) of the projection of the particles.

It is also desirable that the fine spherical silica particles of the present invention have a specific surface area ratio (R), defined by formula (3), of 5.0 or greater, preferably 10 to 100:

$$R = \frac{\text{specific surface area determined by BET method}}{\text{specific surface area calculated based on equivalent spheres}} \qquad (3)$$

The "specific surface area ratio" indicates the degree of porosity of the silica particles. When the value of this ratio is less than 5, the particle has poor affinity for PENBB and also is unsatisfactory for improving the wear resistance of the produced film. Also, when the ratio exceeds 100, the interaction between the particles promotes the agglomeration of the particles, which reduces the performance of the slurry filter and gives rise to coarse protuberances on the film surface.

In the present invention, the content of the fine spherical silica particles in the PENBB composition should be 0.001 to 5% by weight based on PENBB. When the particle content is less than 0.001% by weight, slipping properties and wear resistance of the film are not sufficiently improved, and when the particle content exceeds 5% by weight, the film surface is too rough due to increased amounts of agglomerates of particles and coarse protuberances increase.

The fine spherical silica particles used in the present invention have a very narrow particle size distribution and excellent dispersibility in ethylene glycol, so that no specific dispersing or classifying treatment is necessary and also can be easily filtered with a slurry filter.

In the preparation of the PENBB composition of the present invention, the fine spherical silica particles are preferably added in the course of the PENBB synthesis. For example, it is recommended to add the particles before the ester exchange reaction, before the esterification reaction, during the ester exchange or esterification reaction, or after the end of ester exchange or esterification reaction and before start of polycondensation reaction.

The copolyester is obtained by polycondensation of the corresponding diacid mixture or lower dialkyl diester and the corresponding diol. Both components should preferably be employed in roughly equimolar ratios. It may however be advantageous to employ one of the components—especially the diol—in excess, for instance in order to influence the reaction kinetics or to serve as a solvent. The polycondensation is carried out according to known processes used e.g. in the production of polyethylene terephthalate (PET). Usually about 100 mole-% of the dicarboxylic acid or dialkyl-dicarboxylate mixture are mixed with >100 mole-% of the corresponding diol(s). This mixture is then heated to about 200° C., preferably in the presence of a transesterification catalyst, until sufficient lower alkyl alcohol has been removed from the mixture via distillation. This reaction yields an oligomer or a low molecular weight polyester, which is subsequently subjected to polycondensation, preferably in the presence of a stabilizer and/or catalyst. Useful stabilizers and catalysts can be polyphosphates, triorganyl phosphates, antimony trioxide or tetraalkoxy titanate(IV or mixtures of triphenylphosphate and antimony trioxide. A preferred process for the production of such copolyesters is described in U.S. patent application Ser. No. 07/735,553 which is incorporated herein by reference, and in U.S. Pat. No. 5,453,321, which issued from a continuation-in-part of a continuation of said application Ser. No. 07/735,553 (which earlier applications are now abandoned). A further increase in molecular weight can be achieved by solid phase polycondensation at a temperature just below the melting point under vacuum, or a stream of dry air or inert gas.

In the copolyester composition of the present invention, the use of other types of inactive particles in combination with the fine spherical silica particles (particles (A)) is preferred. This further improves wear resistance of the film made from the PENBB composition. This also improves the electromagnetic properties of the film, especially when it is used for a magnetic tape.

The following two groups of particles (I and II) can be cited as typical examples of other types of inactive particles (particles (B)) usable in the present invention:

B-I: silica particles other than the fine spherical silica particles, calcium carbonate particles, amorphous zeolite particles, fine particles of anatase type titanium dioxide, calcium phosphate kaolin, talc, clay and the like;

B-II: fine particles precipitated by the result of the reaction of phosphorus and compounds and residues of ester exchange catalysts in the copolyester condensation reaction system, for example, fine particles comprising calcium, lithium and phosphorus compounds, fine particles comprising calcium and phosphorus compounds, and fine particles comprising calcium, magnesium and phosphorus compounds.

In the case that other types of inactive particles (particles (B)) are used in combination with particles (A), the mixing ratio, of particles (A) and particles (B-I) or particles (B-II) is preferably selected in accordance with the following conditions.

In the case of combined use of particles (A) and particles (B-I) the ratio of diameter of (B-I) particles to diameter of (A) particles ($D_2/D_1$) is 1.1–3, preferably 1.5–2.0, and the amount of (B-I) particles used is 0.005 to 1.0% by weight, preferably 0.01 to 0.7% by weight, based on PENBB.

If the $D_2/D_1$ ratio is less than 1.1, the improvement of wear resistance and winding properties of the film made from the composition will be unsatisfactory. Also, if the $D_2/D_1$ ratio exceeds 3.0, the surface of the film will become too rough and also the amount of large particles in the film, which cause drop outs or other defects, will further reduce the film quality.

If the content of particles (B-I) in the copolyester composition is less than 0.005% by weight, the wear resistance and winding property of the film will not be improved to satisfactory degree. If the content of particles (B-I) exceeds 1.0% by weight, there will result too large surface roughness of the film and an increased amount of large-sized particles which may cause drop-outs or other defects, thus deteriorating the film quality.

The weight ratio of particles (B-I) to particles (A) is preferably in the range of 0.005 to 0.5, more preferably 0.01 to 0.1.

It is possible to use particles (A) themselves as particles (B-I) as far as the particle size and amount of these particles fall within the above-defined ranges.

In the combined use of particles (A) and particles (B-II), the latter are used in an amount of 0.05 to 1.0% by weight, preferably 0.05 to 0.4% by weight, based on PENBB. If the content of (B-II) particles is less than 0.05% by weight, the surface roughness of the film will be too low to provide the desired slipping properties. On the other hand, if the content of (B-II) particles is higher than 1.0% by weight, the film surface will be too rough, causing a deterioration of electromagnetic properties when in use as an electromagnetic recording medium substrate. The diameter of particles (B-II) is usually about 0.1 to 3 μm.

A preparation process of PENBB containing precipitated particles especially suited for use in this invention will now be described in detail.

A copolyester containing such particles can be obtained, for example, by carrying out an ester exchange reaction in the presence of a lithium compound and a calcium compound, adding to the reaction product at least one compound selected from the group consisting of phosphoric acid, phosphorous acid or alkyl or allyl esters thereof in an amount of 0.6 to 3 times the total amount of said metallic compounds, and successively carrying out a polycondensation reaction.

Lithium compounds which can be dissolved in the esterification or ester exchange reaction product can be used in the ester exchange reaction. Examples of such lithium compounds are salts of aliphatic carboxylic acids such as acetic acid, propionic acid and butyric acid, salts of aromatic carboxylic acids such as benzoic acid and p-methylbenzoic acid, and lithium glycolates of ethylene glycol or propylene glycol. Among them, aliphatic lithium carboxylate, especially lithium acetate, is preferred. The amount of such lithium compounds added is preferably 0.03 to 0.4% by mole, more preferably 0.1 to 0.2% by mole, based on the aromatic dicarboxylic acid components for PENBB.

As the calcium compounds which can be used in the ester exchange reaction, it is possible to use any of those calcium compounds soluble in the esterification or ester exchange reaction product. Examples of such calcium compounds are salts of aliphatic carboxylic acids such as acetic acid, propionic acid and butyric acid, salts of aromatic carboxylic acids such as benzoic acid and p-methylbenzoic acid, and calcium glycolates of ethylene glycol or propylene glycol. Among them, aliphatic calcium carboxylate, especially calcium acetate is preferred.

The amount of such calcium compound to be used in the ester exchange reaction is preferably 0.05 to 0.3% mole-%, more preferably 0.08 to 0.15% mole-% based on the aromatic dicarboxylic acid components of PENBB.

As the phosphorus compound, any phosphorus compounds which have been reacted with the metallic compounds and are partially or wholly converted into a phosphate or phosphite salts may be employed, but it is preferred to use phosphoric acid, trialkyl esters of phosphoric acid, partial alkyl esters of phosphoric acid, phosphorous acid, trialkyl esters of phosphorous acid, and partial alkyl esters of phosphorous acid.

Such phosphorus compound is added in an amount of 0.6 to 3 equivalents, preferably 0.8 to 2 equivalents, more preferably 0.9 to 1.5 equivalents to the total amount of the metallic compounds.

The equivalent ratio of phosphorus compound to metallic compounds is given by the following formula (4):

$$\frac{P}{Ca + \frac{1}{2} Li} \quad (4)$$

wherein P, Ca and Li represent the amount of phosphorus compound, calcium compound and lithium compound (expressed in moles), respectively.

As described above, precipitated particles containing metallic elements and phosphorus element can be obtained by using the metallic compounds and phosphorus compounds in combination.

It is especially preferable that each of calcium, lithium and phosphorus element be contained in an amount of 1.0% by weight or more based on the precipitated particles. In this case, it is possible to form a great many of sharp and uniform fine protuberances on the film surface, which greatly contributes to the improvement of slip characteristics of the film.

Of course, part or all of lithium or calcium compound may be added after the ester exchange reaction has been completed.

In this invention, the particles containing lithium, calcium and phosphorus elements precipitated in PENBB are used in an amount of 0.05 to 1.0% by weight, preferably 0.05 to 0.4% by weight, more preferably 0.06 to 0.18% by weight, based on the copolyester film. In this case, the quantitative determination of the precipitated particles is made in the following way.

Quantitative determination of precipitated particles in the PENBB film:

1.0 liter of o-chlorophenol is added to 100 g of PENBB, and the mixture is heated at 120° C. for 3 hours and then centrifuged with Beckmann Ultracentrifuge L3-50 at 30,000 r.p.m. for 40 minutes, and the resulting particles are dried in vacuo at 100° C. These particles are measured by a differential scanning calorimeter, and when a melt peak corresponding to PENBB has appeared, the particles are added with o-chlorophenol, heated, then cooled and centrifuged again. When the melt peak due to PENBB has disappeared, the weight of said particles is regarded as the weight of precipitated particles and the weight ratio to PENBB is calculated.

In the present invention, when using B-I particles, it is preferable to choose those with a Moh's hardness of 4.0 or below. If the Moh's hardness of the particles is higher than 4.0, the film and rolls may suffer from scratches when the film is wound up or subjected to calendaring after it has been coated with a magnetic layer.

The PENBB composition of this invention can be used for producing a biaxially drawn PENBB film. To produce the film, the polymer melt is extruded through a die onto a chill roll where it solidifies, is then biaxially oriented, heat set, optionally post treated and wound on a roll. For a multilayer film, known methods for coextrusion, in-line or off-line coating can be used. The solidified film as extruded on the chill roll should be obtained in an essentially amorphous state. To achieve this, the melt film must be pinned to the chill roll by a known method such as electrostatic pinning or vacuum, air knife or the like.

The biaxial orientation of the film is achieved by stretching the film at elevated temperature in the machine (MD) and transverse direction (TD). This stretching can be either simultaneous or sequential. In the case of sequential stretching the first stretching step can be in either MD or TD, followed by stretching in the other direction. The orientation in MD can also be achieved in several steps, either one after another prior to stretching in TD, or before and after the TD stretching. Preferred temperatures for stretching lie between the glass transition temperature and about 30° C. above the cold crystallization temperature of the PENBB copolymer composition in use (both temperatures can easily be measured on amorphous films by DSC). The total stretch ratios (λ) in MD and TD lie between 1:2 and 1:10, preferably between 1:2.5 and 1:5. The product of the total stretch ratios should be between 1 to 30 preferably between 5 to 20. Biaxial drawing is performed such that the birefringence is 0.2, preferably <0.1 to ensure adequately isotropic properties. Birefringence as mentioned herein is the absolute value of the difference between the maximum and minimum refractive indices in the plane of the film, as measured on common instruments such as Abbé refractometer, optical bench or compensators.

In order to optimize properties, relaxation steps can be included in the orientation and heat setting processes.

The heat setting takes place at a temperature between the cold crystallization temperature and the melt temperature of the copolymer composition.

In some cases a surface treatment such as corona, plasma or flame treatment should be employed before winding the film on a roll.

The biaxially oriented PENBB film obtained from the copolyester composition of the present invention is very useful as base film for magnetic recording media such as magnetic tapes, floppy discs, etc. or as base film for various other types of commercial products such as capacitors, photographic plates, electric insulators, thermosensitive transfer sheets, package films, etc.

The biaxially oriented PENBB film obtained from the copolyester composition of the present invention usually has an average surface roughness ($R_a$) of 0.003 to 0.29 μm and a thickness of 1 to 400 μm, particularly 1 to 20 μm.

Also, the b,axially oriented copolyester film obtained from the PENBB composition of the present invention is excellent in wear resistance and rarely produces drop-outs in magnetic tapes made from it, as the film contains the specific fine spherical silica particles described above. These quality characteristics are particularly pronounced in the film which satisfies the requirements expressed by the following formulae (5) and (6) at the same time:

$$\Sigma H_n \leq 20, 7 \geq n \geq 3 \qquad (5)$$

$$\frac{H_n}{H_{n+1}} \geq 10, 7 \geq n \geq 3 \qquad (6)$$

wherein $H_n$ is the number of interference fringes of n-th order (fringes/cm$^2$) when the film surface was measured by double beam interference method.

The use of the biaxially oriented PENBB film of the present invention for magnetic recording media and capacitors will be described in detail.

In use of the biaxially oriented PENBB of the composition of the present invention as a magnetic recording medium, the starting PENBB composition is preferably the one whose volume resistivity ($P_v$) in the molten state is $1.0 \times 10^8$ Ω.cm or below. If the volume resistivity of the starting PENBB composition when melted exceeds the above value, small dents or recesses are formed in the amorphous sheet made from the composition by an electrostatic cooling method, and when a biaxially stretched film is made therefrom the non-uniformity of the film thickness increases, causing non-uniformity of the magnetic coatings, resulting in a deterioration of electro-magnetic transducing characteristics of the magnetic recording medium.

The volume resistivity ($P_v$) of the starting PENBB composition can be limited to $1.0 \times 10^8$ Ω.cm or below by, for example, adjusting the ratio of the phosphorus compound used as thermal stabilizer to the alkaline earth metal compound used as ester exchange catalyst (P/Me), or by adding an alkaline metal compound after the end of ester exchange reaction or in the early or middle stage of polymerization reaction.

Generally, magnetic recording media can be roughly classified into two types: magnetic tapes and magnetic discs. The thickness of base film used for the former is usually 4 to 30 μm and that used for the latter is usually 30 to 100 μm.

An important mechanical property required for the film for magnetic recording media is that the $F_5$ value of the film in its machine direction is not less than 120 MPa, preferably not less than 160 MPa. The film with an $F_5$ value of less than 120 MPa may tend to elongate after tension, so that the advantageous properties of the fine spherical silica particles can not be put to best use.

The effect of the present invention is maximized when the $F_5$ value in the machine direction of the film ($F_{5MD}$) and the $F_5$ value in the transverse direction ($F_{5TD}$) are defined by the following formula (7), especially by the formula (8):

$$3.0 > \frac{F_{5MD}}{F_{5TD}} > 1.1 \qquad (7)$$

$$2.5 > \frac{F_{5MD}}{F_{5TD}} > 1.6 \qquad (8)$$

Conventional high-strength PET films falling in the above range of $F_5$ values had problems such as anisotropy of physical properties in the transverse direction or insufficient affinity of particles to the polyester, but the present invention has made it possible to solve these problems by the use of the fine spherical silica particles and the new polymer PENBB. PENBB films allow generally high $F_5$ values in both MD and TD direction than e.g. PET films while still fulfilling the above conditions of equations (7) and (8).

Known film production methods can be employed for making $F_5$ value in the machine direction 120 MPa or greater. For example, it can be achieved by a method in which chips of the PENBB composition are melt extruded into a film and solidified to form an amorphous sheet and this sheet is then biaxially stretched in the machine and transverse directions successively or simultaneously, followed by 1.05 to 2.0 fold stretching in the machine direction and heat treatment. In this case, it is possible to properly incorporate such treatments as heat setting before restretching in the machine direction, relaxing in the machine direction before restretching slight-degree stretching in the machine direction before or after restretching, etc. In the case of PENBB, it is possible to obtain a film having an $F_5$ value of 150 MPa or greater in the machine direction.

Concerning the physical properties of the film for magnetic recording media, it is preferred that the film has, in addition to the above characteristics, an average surface roughness ($R_a$), and a number of broken protuberances (Bp) on the film surface defined by the following formulae (9) and (10).

$$5 \leq R_a \leq 30 (\text{nm}) \qquad (9)$$

$$Bp \leq 10 (\text{per mm}^2) \qquad (10)$$

When the average surface roughness is less than 5 nm, the film proves poor in handling properties, running characteristics and wear resistance, while when it exceeds 30 nm, the magnetic recording medium made from the film is found to be poor in electro-magnetic transducing characteristics. The number of broken protuberances on the film surface is an indication of affinity of particles to PENBB. A greater number of broken protuberances indicates lower affinity. Bp values greater than 10/mm$^2$ indicate poor affinity of particles, and in this case, large amounts of powder are deposited on the calender rolls during the production of magnetic recording media, resulting in the deteriorated properties of the products. Wear resistance of the magnetic recording medium at the time of recording and reproduction is also reduced.

Another preferable film property is that the number of coarse protuberances from the film surface having a height of 0.81 μm or greater, is less than 10 per 25 cm$^2$. This parameter is an especially important requirement for the base film of magnetic discs. This property maintains the good film handling characteristics in magnetic disc production and can also enhance the electromagnetic characteristics of the produced magnetic disc.

It is also pointed out as still another preferable film property, that the average surface roughness ($R_a$) (nm) of the film, and the ratio of maximum height of protuberance ($R_t$) (nm) of the film to $R_a$ ($R_t/R_a$) fall within the ranges defined by the following formulae (11) and (12), and that also the number of broken protuberances on the film surface is less than 20 mm$^2$:

$$3 \leq R_a \leq 15 \qquad (11)$$

$$5 \leq R_t/R_a \leq 20 \qquad (12)$$

When $R_a$ is less than 3 nm, the film has unsatisfactory handling characteristics and wear resistance, and when $R_a$ exceeds 15 nm, the recording media produced from it are not satisfactory for a high-density recording. The $R_r/R_a$ ratio is a measure of uniformity of the height of protuberances. Generally, the smaller than $R_r/R_a$ ratio is, the better is the uniformity. However, when the $R_r/R_a$ ratio is less than 5, although the uniformity of protuberance height is good, the protuberances are too broad and the signal output from the medium is decreased. When the $R_r/R_a$ ratio exceeds 20, the protuberance height distribution becomes non-uniform and in this case, too, the signal output decreases. The values of $R_a$ and $R_r/R_a$ are based on average diameter of the particles contained, particle size distribution and particle content, but these values are also variable according to the base film producing conditions, that is, the stretching conditions of the copolyester film made by a biaxial stretching method. In any case, the techniques employable in the present invention are not subject to any specific limitations as far as they meet the requirements of the present invention.

In the case that biaxially oriented PENBB films of the present invention are used for capacitors, the volume resistivity of the starting PENBB composition in the molten state is preferably adjusted to $2.0 \times 10^8$ Ω.cm or higher. When PENBB film is used for capacitors, the copolyester film is required to satisfy some property requirements. One important property requirement is that the film has a specific "CR value" which is the product of electrostatic capacity and insulation resistance at normal and nigh temperature. It has been found that this property requirement can be met when the volume resistivity of the PENBB composition in the molten state is maintained at $2.0 \times 10^8$ Ω.cm or above.

Maintenance of specific volume resistivity ($P_v$) at or above $2.0 \times 10^8$ Ω.cm can be achieved by adjusting the ratio of the phosphorus compound used as thermal stabilizer to the alkaline earth metal compound used as ester exchange catalyst (P/Me). Preferred examples of alkaline earth metal compounds usable here are calcium acetate, magnesium acetate, manganese acetate and the like. Phosphoric acid and phosphoric acid esters can be favorably used as phosphorous compound.

Also, when the biaxially oriented PENBB film of the present invention is used for capacitors, it is preferable that the number of protuberances on film surface is not less than $1.0 \times 10^3$ per mm², and that the difference (Δd) between micrometric film thickness (measured by using 10 pieces of film) and gravimetric film thickness falls within the range defined by the following formula (13):

$$0.1 \, \mu m \leq \Delta d \leq 0.4 \, \mu m \qquad (13)$$

When the number of protuberances on the film surface is less than $1.0 \times 10^3$ per mm², slip characteristics of the film are bad and therefore film handling characteristics are poor.

Δd is a numerical indication of the degree of surface roughness (for the measuring method, see the section of Examples described below). When the value of Δd exceeds 0.4 μm, the electrode gap in the produced capacitor becomes too large, causing a reduction of electric capacity per unit volume. When Δd is less than 0.1 μm, satisfactory slip characteristics cannot be obtained and the handling characteristics are poor.

The present invention will hereinafter be described in further detail in examples. The determination methods and definitions of various properties and characteristics mentioned above are as described below. All references to amounts expressed as "parts" and "%" appearing in the following Examples are based on weight unless otherwise noted.

(1) Average diameter and particle size distribution of fine spherical silica particles The particle diameter was measured by electron microphotography, and the particle size distribution was determined by measuring the diameters of about 1,000 particles and cumulating the numbers of the particles according to diameter, beginning with the largest particle size. The diameter of the particles when the cumulative amount thereof is 10% of the total number of particles was expressed as $D_{10}$ and the diameter of the particles when the cumulative amount thereof is 90% of the total number of particles $D_{90}$, and the degree of breadth of particle size distribution was indicated by the value of $D_{10}/D_{90}$, (diameter distribution index).

Measurements of other additive particles were made by centrifugal precipitation method.

(2) Volumetric shape parameter of fine spherical silica particles

In the present invention, volumetric shape parameter ($\phi v$) is defined as $V/D^3$ wherein D is the maximum diameter (μm) of fine spherical silica particles as measured by electron microphotography and V is the measured volume (μm³) of the particles.

(3) Specific surface area ratio (R) of fine spherical silica particles $$R = \frac{\text{specific surface area determined by BET method}}{\text{specific surface area calculated based on equivalent spheres}} \qquad (3)$$

The specific surface area determined by BET method is the value determined from the adsorption of nitrogen gas at the temperature of liquid nitrogen.

(4) Inherent viscosity (IV) of polyester composition 0.1 g of PENBB composition was dissolved in 1 dl (=100 ml) of a 50/50 (by weight) pentafluorophenol/hexafluoroisopropanol mixed solvent, and the viscosity of the solution was measured at 25° C. The IV value is determined by the equation:

$$IV = \frac{\ln \eta_{rel}}{c} \left( \frac{dl}{g} \right)$$

wherein $$\eta = \frac{\text{viscosity solution}}{\text{viscosity solvent}}$$

and c=polymer concentration.

(5) Particle dispersibility in film

It was determined by observing under a microscope the dispersed state of particles added in a biaxially stretched film.

(6) Volume resistivity of the PENBB composition in the molten state 12 g of PENBB composition was put into a test tube having a side arm equipped with a stopcock for introduction of $N_2$ or evacuation and then dipped in an oil bath of 290° C. After the composition has been perfectly melted, air bubbles were completely removed by repeating evacuation and introduction of nitrogen gas. Then stainless steel electrodes were inserted into the test tube, and after 10 min., a direct current of 3 kV was applied to the electrodes. Immediately after current application, the current was read and the specific resistance was calculated from the following formula:

$$P_v = \frac{3000}{I} \cdot \frac{s}{l} \ (\Omega \cdot cm)$$

In the above formula, $P_v$ is specific resistance ($\Omega$.cm), I is current (A), S is cross-sectional area ($cm^2$) Of the electrode, and l is the distance (cm) between the electrodes.

(7) Surface roughness $R_a$

The $R_a$ value gives the surface roughness in the form of the arithmetic average of all displacements of the roughness R from the center line. The measurement is performed according to DIN standard 4768 on a surface tester (Perthometer SPG made by Feinprüf GmbH of Göttingen, Germany). The values given are based on 10 individual measurements, 5 in MD and 5 in TD, in which the highest value is discarded before averaging. The cut-off, i.e. individual length of the measurement sections, is 0.08 mm, the stylus radius 2 μm and 30 mg.

(8) Maximum height of protuberance

Maximum height of protuberance was expressed by the difference between the maximum value and the minimum value of the sectional curve of film obtained in the determination of surface roughness described in the preceding section. $R_t$ shown here is the average of the measurements at total 10 points as in the case of Ra.

(9) Number of coarse protuberances.

Aluminum was deposited on the film surface and the sample examined with a double beam interference microscope. The protuberances showing the 2nd order interference fringes at a measuring wavelength of 0.54 μm ($H^2$) were inferred to have a height between 0.54 and 0.81 μm, and the protuberances showing interference fringes of 3rd and higher orders ($H^3$) were inferred to have a height of 0.81 μm or greater. The number of these protuberances was counted per 25 $cm^2$.

(10) Number of surface protuberances

The number of protuberances per 0.1 $mm^2$ was counted from light microphotographs of film surface and converted to the number per 1 $mm^2$.

(11) Degree of surface roughness, Δd a) Micrometric film thickness measured with 10 pieces of film placed one on another is indicated by $d_{10}$. The thickness of a pile of 10 pieces of film was measured by using a 1/1000 micrometer with a measuring force of 700±100 gf and a measuring length of 0–25 mm, and the obtained value was divided by 10 to give the $d_{10}$ value (μm).

b) Gravimetric film thickness is indicated by $d_w$. A 10 cm square piece was cut out from the film and its weight W was measured by Mettler electron balance, and $d_w$ was determined from the following formula:

$$d_w = \frac{W}{1.4} \cdot 10^2 \ (\mu m)$$

c) Δd was defined as follows:

Δd=$d_{10}$–$d_w$(μm)

(12) Mechanical properties

The tensile modulus, tensile strength, elongation at break and $F_5$ value (stress at 5% elongation) were determined in a tensile tester made by Zwick (Ulm, Germany) under an atmosphere of 23° C. and 50% RH under the following conditions:

Specimen shape: strip film (15 cm long and 15 mm wide)
Initial chuck interval: 100 mm
Draw rate: 10%/min for modulus 100% /min for other values

(13) Number of broken protuberances

The gold-deposited film surface was photographed at a magnification of 2000 by a scanning electron microscope, and the number of the depressions or dents made after disappearance of protuberances believed to be formed by particles was counted and converted to the number per unit surface area. Smaller values are desirable.

EXAMPLE 1

Synthesis of silica particles 30.4 g of tetramethylsilane is dissolved in 297 g of methanol and maintained at 20° C. (solution A). Separately, 95 g of water is added to 878 g of methanol and this solution is mixed with 243 g of a 28% aqueous ammonia solution and maintained at 20° C. (solution B). The solution A is added to solution B under stirring. Upon addition, hydrolysis and condensation take place, and the reaction system becomes cloudy. After the addition of solution A, the mixed solution is further stirred for one hour, after which 288 g of ethylene glycol ae added. The mixture is then heated under reduced pressure to distill off excess water, methanol and ammonia, obtaining an ethylene glycol slurry containing silica in a concentration of 4%. After drying this ethylene glycol slurry, the average particle diameter is determined by electron microphotograph. The average particle diameter is 0.15 μm and $D_{10}/D_{90}$ is 1.59. Uniformly spherical particles with extremely high uniformity in size are obtained. The slurry is filtered using a 3 μm filter. The slurry shows excellent filtering characteristics.

EXAMPLE 2

PENBB COMPOSITION 289 parts by weight of dimethyl 2,6-naphthalene dicarboxylate, 322 parts by weight of dimethyl, 4,4'-bibenzoate, 386 parts by weight of ethylene glycol and 0.7 parts of manganese acetate tetrahydrate are initially introduced into a conventional polycondensation reactor provided with a blanketing gas line (and $N_2$), pressure equalization, a thermometer, a condenser, a vacuum connection and a stirrer. The mixture was heated at 220° C. for 2.5 hours, during which time methanol was distilled off. 0.675 parts by weight of triphenyl phosphate, 0.2259 parts of antimony trioxide and 57 parts of the above silica slurry (at a concentration of 4%) are then added and the mixture is heated to 270° C., with stirring. Vacuum is applied and the temperature is raised to 285° C. and maintained for 2.5 hours. A portion of the copolyester thus obtained is ejected from the reactor in the form of melt as a bubble under nitrogen pressure and solidified as a thin, clear, amorphous film. A glass transition temperature ($T_g$) of 123° C. and a cold crystallization temperature ($T_{cc}$) of 132° C. is determined for the film by means of DSC. The residual melt is then granulated. These PENBB granules, having a melting point of 281° C. are melted in a single screw extruder at temperatures of 280°–320° C. and extruded through a sheet dye unto a cooling roll temperature controlled at 30° C.

A 120 μm thick film is obtained which is clear and transparent. This PENBB pre-film is then sequentially biaxially oriented (first transversely, then longitudinally: 3.5×3.5) at 130° C. on a film stretching device. An 8 μm thick, clear film is obtained. The film is finally heat treated at 260° C. for 10 minutes. The film showed excellent coefficient of friction, low number of coarse particles, good winding characteristics and wear resistance. Compared to similarly prepared PET films, the mechanical properties of the resultant PENBB film are much better, as shown in Table I.

TABLE I

| Property | Units | PENBB | PET |
|---|---|---|---|
| Tensile Strength | | | |
| MD | (MPa) | 240 | } 100–200 |
| TD | | 180 | |
| Elongation at Break | | | |
| MD | (%) | 25 | } 50 |
| TD | | 20 | |
| $F_5$ value | | | |
| MD | (MPa) | 172 | } 100–130 |
| TD | | 151 | |
| Tensile Modulus | | | |
| MD | (GPa) | 9.2 | } 4–6 |
| TD | | 8.1 | |
| Shrinkage (at 150° C. for 15 minutes) | | | |
| MD | (%) | 0.3 | >1.0 |
| TD | | 0.3 | >1.0 |

That what is claimed is:

1. A copolyester composition comprising poly(ethylene naphthalate bibenzoate) and 0.001 to 5% by weight of a fine spherical silica particles having an average diameter of 0.01 to 3.0 μm.

2. Copolyester composition according to claim 1, wherein said fine spherical silica particles are obtained by subjecting alkoxysilane to a hydrolysis and condensation reaction.

3. The copolyester composition according to claim 2, wherein said fine spherical silica particles comprises 90% by weight or more of silicon dioxide.

4. A copolyester composition according to claim 1 wherein the diameter distribution index of said fine spherical silica particles, represented by the formula (1), is in the range of 1.1 to 2.7:

$$\frac{D_{10}}{D_{90}} \quad (1)$$

wherein $D_{10}$ is the diameter of the particle when the cumulative number thereof is 10% of the total number of said particles, $D_{90}$ is the diameter of the particle when the cumulative number thereof is 90% of the total number of said particles and $D_{10}$ and $D_{90}$ are measured under an electron microscope, said cumulative numbers being calculated beginning with the largest particle size.

5. The copolyester composition according to claims 1 or 5 wherein the fine spherical silica particles have a volumetric shape parameter represented by the following formula 2:

$$0.4 \leq \phi v \leq \frac{\pi}{6} \quad (2)$$

wherein $\phi v$ is defined as $\phi v = V/D^3$, wherein V is the volume of the particle (μm$^3$) and D is the maximum projected diameter (μm) of the projection of the particle.

6. The copolyester composition according to claims 1 or 4, wherein said fine spherical silica particles have a specific surface area ratio defined by the following formula (3) of 5.0 or above:

$$R = \frac{\text{specific surface area determined by BET method}}{\text{specific surface area calculated based on equivalent spheres}} \quad (3)$$

7. The copolyester composition according to claim 1 which comprises a combination of fine spherical silica particles (A) and inactive particles (B) other than particles (A).

8. The copolyester composition according to claim 7 wherein the particles (B) are particles (B-I) selected from the group consisting of silica particles other than the fine particles (A), calcium carbonate, amorphous zeolite, titanium dioxide, calcium phosphate, kaolin, talc, clay and mixtures thereof.

9. The copolyester composition according to claim 8 which contains in addition to the fine particles (A), 0.005 to 1.0% by weight of the particles (B-I) having a $D_2/D_1$ ratio defined by the following formula in the range of 1.1 to 3.0:

$$(D_2/D_1) = \frac{\text{average diameter of fine particles } (B)}{\text{average diameter of fine particles } (A)}$$

10. The copolyester composition according to claim 9, wherein the Moh's hardness of said particles (B-I) is 4.0 or below.

11. The copolyester composition according to claim 7 wherein the particles (B) are particles (B-II) selected from the group consisting of fine particles comprising calcium, lithium and phosphorous compound, fine particles comprising calcium and phosphorous compounds and fine particles comprising calcium, magnesium and phosphorous compounds, said fine particles having a diameter of about 0.1 to 3 μm.

12. The copolyester composition according to claim 11 which contains the particles (B-II) in an amount of 0.05 to 1.0% by weight based on the poly(ethylene naphthalate bibenzoate).

13. The copolyester composition according to claim 11 or 12, wherein the particles (B-II) are particles containing the elements calcium, lithium and phosphorous each in an amount of 1.0% by weight or more based on the weight of said particles (B-II).

14. The biaxially oriented copolyester film according to any one of claims 1, 4, 7, 8, 9, 10, 11, 12, wherein the film surface roughness ($R_a$) and the number of broken protuberances per 1 mm$^2$ (Bp) on the film surface satisfy the following formulae (9) and (10):

$$5 \leq R_a \leq 30 \text{ (nm)} \quad (9)$$

$$Bp \leq 10 \quad (10)$$

15. A biaxially oriented copolyester film comprising the copolyester composition according to claims 1 or 7.

16. The biaxially oriented copolyester film according to claim 15, wherein the number of interference fringes of n-th order ($H_n$ per 1 cm$^2$) as measured by double beam interference method, satisfies the following formulae (5 and (6):

$$\Sigma H_n \leq 20, 7 \geq n \geq 3 \quad (5)$$

$$\frac{H_n}{H_{n+1}} \geq 10, 7 \geq n \geq 3 \quad (6)$$

17. The biaxially oriented copolyester film according to claim 16 wherein the $F_5$ value of the film in the machine direction is 120 MPa or above and the birefringence is less than 0.2 and the inherent viscosity of the poly(ethylene naphthalate bibenzoate) is greater than 0.5 dl/g.

18. The biaxially oriented copolyester film according to claim 17 wherein the film surface roughness ($R_a$) and the number of broken protuberances per 1 mm$^2$ (Bp) on the film surface satisfy the following formulae (9) and (10)

$$5 \leq R_a \leq 30 \text{ (nm)} \quad (9)$$

$$Bp \leq 10 \quad (10)$$

and the number of coarse protuberances having a height of 0.81 μm or greater on the film surface is 10 or less per 25 cm² and the number of coarse protuberances having a height of 0.54 μm to less than 0.81 um is 50 or less per 25 cm² and wherein the diameter distribution index of the particles (A) represented by the formula (1) is in the range of 1.1 to 2.7

$$\frac{D_{10}}{D_{90}} \qquad (1)$$

wherein $D_{10}$ is the diameter of the particle when the cumulative number thereof is 10% of the total number of said particles, $D_{90}$ is the diameter of the particle when the cumulative number thereof is 90% of the total number of said particles and $D_{10}$ and $D_{90}$ are measured under an electron microscope, said cumulative numbers being calculated beginning with the largest particle size.

19. The biaxially oriented copolyester film according to claim 15, wherein the $F_5$ value of the film in the machine direction is 120 MPa or above.

20. The biaxially oriented copolyester film according to claim 15, wherein the birefringence is less than 0.2 and the inherent viscosity of the poly(ethylene naphthalate bibenzoate) is greater that 0.5 dl/g.

21. The biaxially oriented copolyester film according to claims 19 or 20 wherein the number of coarse protuberances having a height of 0.81 μm or greater on the film surface is 10 or less per 25 cm² and the number of coarse protuberances having a height of 0.54 μm to less than 0.81 μm is 50 or less per 25 cm².

22. The biaxially oriented copolyester film according to claims 19 or 20 wherein the average surface roughness $R_a$ (nm) of the film and the ratio of the maximum height of protuberance $R_t$ (nm) of the film to $R_a$ satisfy the following formulae (11) and (12), respectively, and the number of broken protuberances on the film surface is 20 or less per mm²:

$$3 \leq R_a \leq 15 \qquad (11)$$

$$5 \leq R_t/R_a \leq 20 \qquad (12).$$

23. The biaxially oriented copolyester film according to claims 19 or 20 wherein said film has a thickness of 4 to 30 μm.

24. The biaxially oriented copolyester film according to claims 19 or 20 wherein said film has a thickness of 30 to 100 μm.

\* \* \* \* \*